United States Patent
Wei et al.

(10) Patent No.: US 8,693,497 B2
(45) Date of Patent: Apr. 8, 2014

(54) LONG-REACH ETHERNET SYSTEM AND RELAY

(75) Inventors: Chushun Wei, Beijing (CN); Wei Li, Beijing (CN); Guojun Zhou, Beijing (CN); Yang Yu, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 565 days.

(21) Appl. No.: 12/994,295

(22) PCT Filed: May 20, 2009

(86) PCT No.: PCT/CN2009/071872
§ 371 (c)(1),
(2), (4) Date: Nov. 23, 2010

(87) PCT Pub. No.: WO2009/140918
PCT Pub. Date: Nov. 26, 2009

(65) Prior Publication Data
US 2011/0085584 A1  Apr. 14, 2011

(30) Foreign Application Priority Data

May 23, 2008 (CN) .......................... 2008 1 0112635

(51) Int. Cl.
*H04L 12/44* (2006.01)
(52) U.S. Cl.
USPC .......................................... 370/466; 370/467
(58) Field of Classification Search
None
See application file for complete search history.

(56) References Cited

U.S. PATENT DOCUMENTS

| | | | |
|---|---|---|---|
| 5,659,464 A * | 8/1997 | Esser | 363/41 |
| 6,597,183 B1 * | 7/2003 | Male | 324/607 |
| 6,737,935 B1 * | 5/2004 | Shafer | 333/132 |
| 7,092,412 B1 * | 8/2006 | Rezvani et al. | 370/536 |
| 7,426,374 B2 * | 9/2008 | Dwelley et al. | 455/127.1 |
| 7,511,515 B2 * | 3/2009 | Herbold | 324/691 |
| 7,705,741 B2 * | 4/2010 | Picard | 340/652 |

(Continued)

FOREIGN PATENT DOCUMENTS

| CN | 1719756 A | 1/2006 |
|---|---|---|
| CN | 101026469 A | 8/2007 |

(Continued)

OTHER PUBLICATIONS

Cisco, "Cisco Long-Reach Ehternet Solution," Apr. 2002, Cisco. com, pp. 1-9.*

(Continued)

*Primary Examiner* — Bunjob Jaroenchonwanit
(74) *Attorney, Agent, or Firm* — Ladas & Parry LLP (57) ABSTRACT

The present invention discloses a long-reach Ethernet system. The system includes a first Ethernet device and a second Ethernet device which communicate with each other, and a relay; wherein one of the first Ethernet device and the second Ethernet device is a conventional Ethernet device, and the other one of the first Ethernet device and the second Ethernet device is a conventional Ethernet device or a long-reach Ethernet device; the first Ethernet device and the second Ethernet device communicate with each other via the relay; and the relay is adapted to transform conventional Ethernet data into long-reach Ethernet data and transform long-reach Ethernet data into Ethernet data. The present invention can realize the communication of two Ethernet devices when at least one of the two Ethernet devices is a conventional Ethernet device and a working distance between them is longer than 100 meters.

11 Claims, 7 Drawing Sheets

(56) References Cited

U.S. PATENT DOCUMENTS

| | | | |
|---|---|---|---|
| 7,706,392 B2* | 4/2010 | Ghoshal et al. | 370/419 |
| 7,805,114 B1* | 9/2010 | Quintana et al. | 455/90.1 |
| 7,827,419 B2* | 11/2010 | Shaffer et al. | 713/300 |
| 7,843,670 B2* | 11/2010 | Blaha et al. | 361/18 |
| 7,865,754 B2* | 1/2011 | Burkland et al. | 713/340 |
| 7,956,616 B2* | 6/2011 | Yu | 324/525 |
| 8,064,179 B2* | 11/2011 | Apfel | 361/90 |
| 8,125,998 B2* | 2/2012 | Anto Emmanuel | 370/401 |
| 8,281,165 B2* | 10/2012 | Schindler | 713/300 |
| 8,386,088 B2* | 2/2013 | Velez et al. | 700/297 |
| 2002/0156913 A1* | 10/2002 | Tsang et al. | 709/236 |
| 2003/0133712 A1* | 7/2003 | Arikawa et al. | 398/2 |
| 2003/0149746 A1* | 8/2003 | Baldwin et al. | 709/219 |
| 2005/0243861 A1* | 11/2005 | Elkayam et al. | 370/466 |
| 2006/0077891 A1* | 4/2006 | Smith et al. | 370/220 |
| 2006/0155908 A1 | 7/2006 | Rotvold et al. | |
| 2006/0163949 A1* | 7/2006 | Barrass | 307/19 |
| 2006/0206933 A1* | 9/2006 | Molen et al. | 726/14 |
| 2006/0239183 A1* | 10/2006 | Robitaille et al. | 370/217 |
| 2006/0290208 A1* | 12/2006 | Chang et al. | 307/116 |
| 2007/0060362 A1* | 3/2007 | Osgood et al. | 463/42 |
| 2007/0081553 A1* | 4/2007 | Cicchetti et al. | 370/466 |
| 2007/0286599 A1 | 12/2007 | Sauer et al. | |
| 2008/0253392 A1* | 10/2008 | Diab | 370/466 |
| 2009/0245274 A1* | 10/2009 | Hurwitz et al. | 370/445 |
| 2012/0242168 A1* | 9/2012 | Tsai et al. | 307/112 |

FOREIGN PATENT DOCUMENTS

| | | |
|---|---|---|
| CN | 101072064 A | 11/2007 |
| CN | 101282275 A | 10/2008 |
| JP | 2003-333043 A | 11/2003 |
| JP | 2007-110361 A | 4/2007 |
| JP | 2007-281628 A | 10/2007 |

OTHER PUBLICATIONS

IEEE; "802.3af™ Part 3: Carrier Sense Multiple Access with Collision Detection (CSMA/CD) Access Method and Physical Layer Specifications Amendment: Data Terminal Equipement (DTE) Power via Media Dependent Interface (MDI)", Published by The Institute of Electrical and Electronics Engineers, Inc. Jun. 18, 2003, 121 pages.
International Search Report: PCT/2009/071872.

* cited by examiner

LONG-REACH ETHERNET SYSTEM AND RELAY

FIELD OF THE INVENTION

The present invention relates to network power supply techniques, and more particularly, to a long-reach Ethernet system and a replay in the system.

BACKGROUND OF THE INVENTION

In an Ethernet system, two Ethernet devices are directly connected via a cable. A link between the two Ethernet devices is a conventional Ethernet link and a working distance between the two Ethernet devices is within 100 meters. In order to realize long-reach Ethernet communication longer than 100 meters, a long-reach Ethernet device is proposed at present. The long-reach Ethernet device adopts an advanced coding method to decrease a code rate of Ethernet data, so as to extend the working distance from 100 meters to 500 meters or even to a longer distance. A link between two long-reach Ethernet devices is a long-reach Ethernet link for bearing long-reach Ethernet data. It is required in the long-reach Ethernet communication that two communication ends are both long-reach Ethernet devices and the long-reach Ethernet devices are connected with each other directly via a cable. However, a large number of existing Ethernet devices are constructed by a conventional Ethernet technology. Therefore, if one of two Ethernet devices needing long-reach communication is a conventional Ethernet device, the communication between the two Ethernet devices cannot be performed normally.

Figure 1:
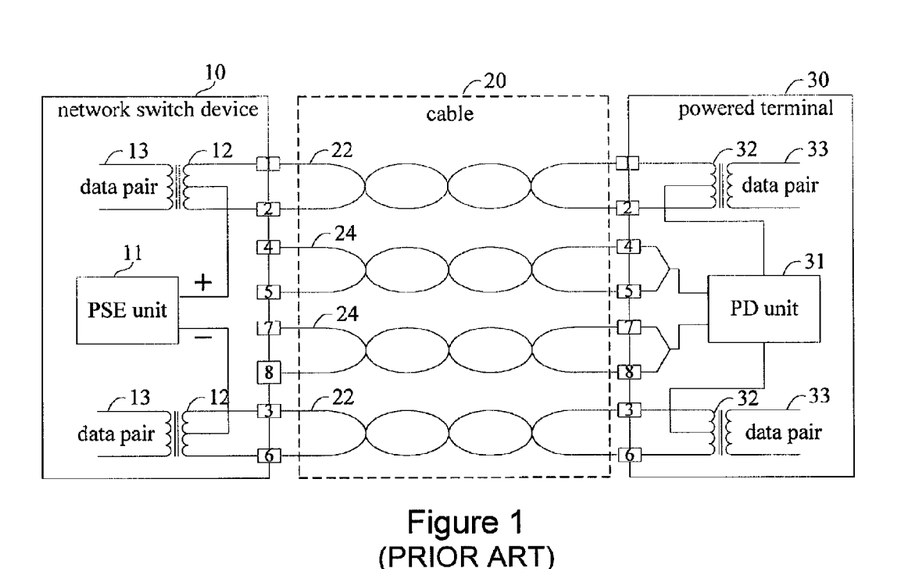
FIG. 1 is a schematic diagram illustrating the structure of a POE system in an Endpoint PES mode A in the prior art.
Figure 2:
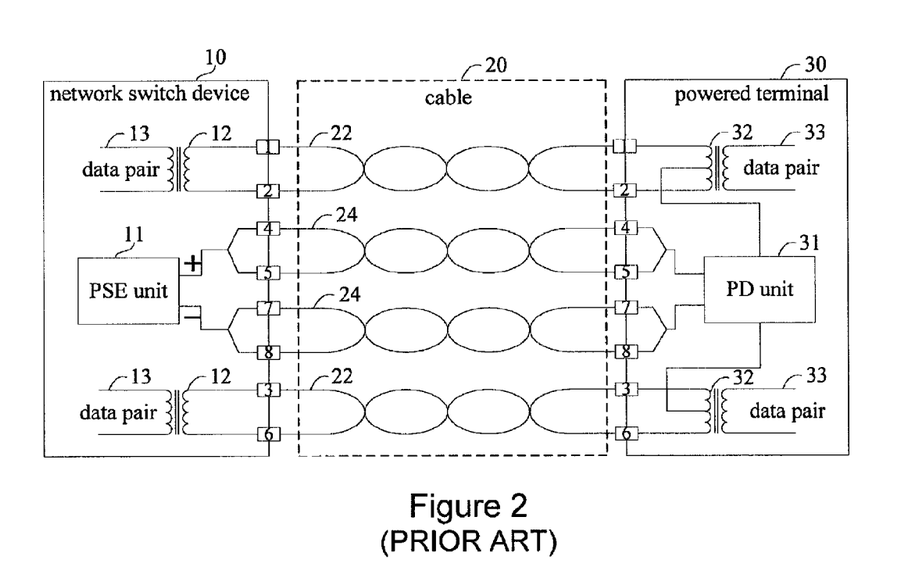
FIG. 2 is a schematic diagram illustrating the structure of a POE system in an Endpoint PES mode B in the prior art.
Figure 3:
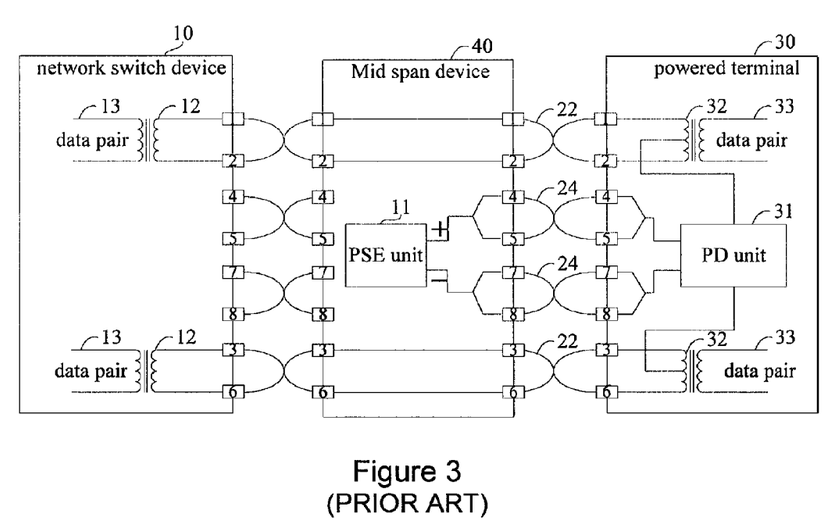
FIG. 3 is a schematic diagram illustrating the structure of a POE system in a Mid span mode in the prior art.

At present, a Powered over Ethernet (POE) technology which is defined in IEEE802.3af-2003 published by the IEEE standard committee also requires that two communication ends have the same type and are directly connected with each other. The POE technology provides power to data terminal devices via a cable having four twisted pairs. FIG. 1 to FIG. 3 show three kinds of POE systems defined in IEEE802.3af-2003.

FIG. 1 is a schematic diagram illustrating the structure of a POE system in an Endpoint Power Sourcing Equipment (PSE) mode A in the prior art. As shown in FIG. 1, the POE system includes a PSE unit 11 and a Powered Device (PD) unit 31. The PSE unit 11 is configured in a network switch device 10 acting as a power sourcing end. The network switch device 10 may be a hub, a switch or a router. The PD unit 31 is configured in a powered terminal 30 acting as a powered end. The powered terminal 30 may be an Ethernet data terminal such as an IP telephone, a wireless local network Access Point (AP) or a network video camera. The network switch device 10 and the powered terminal 30 are directly connected via a cable 20. Wires 1/2 ("1/2" represents a wire 1 and a wire 2), wires 3/6, wires 4/5 and wires 7/8 in the cable 20 respectively form a twisted pair. 10 Mbps Ethernet and 100 Mbps Ethernet transmit Ethernet data respectively via one or two twisted pairs in the cable, and 1000 Mbps Ethernet transmits Ethernet data via four twisted pairs. Taking an example that the Ethernet data are transmitted via two twisted pairs, two twisted pairs formed by wires 1/2 and wires 3/6 in the cable 20 respectively act as a data pair 22, and two twisted pairs formed by wires 4/5 and wires 7/8 are unused and respectively act as a spare pair 24. Each data pair 13 in the network switch device 10 is coupled to one data pair 22 in the cable 20 via a transformer 12. Positive and negative power outputs of the PSE 11 are respectively connected with center taps of two transformers 12, so as to apply power between the two data pairs 22. The two data pairs 22 bear Ethernet data and the power at the same time, where the Ethernet data are alternate current signals, the power is a direct current signal, and thus they can be differentiated according to different frequencies. Each data pair 33 in the powered terminal 30 is coupled to one data pair 22 in the cable 20 via a transformer 32. The PD unit 31 is connected with two center taps of two transformers 32, so as to obtain the power from the two data pairs 22.

In the Endpoint PSE mode A shown in FIG. 1, the data pairs 22 bears the power. FIG. 2 shows an Endpoint PSE mode B in which the spare pairs 24 bears the power. As shown in FIG. 2, the difference between FIG. 1 and FIG. 2 lies in that, in FIG. 2, the positive and negative power outputs of the PSE unit 11 are respectively connected with the two spare pairs 24, so as to apply the power between the two spare pairs 24. Thus, the data pairs 22 are only used for transmitting the Ethernet data, and the PD unit 31 obtains the power directly from the spare pairs 24. In both FIG. 1 and FIG. 2, the PSE unit 11 is configured in the network switch device 10, and thus the modes shown in FIG. 1 and FIG. 2 are called as Endpoint PSE modes. FIG. 3 shows a Mid span mode in which the PSE unit 11 is configured in an intermediate device.

FIG. 3 is a schematic diagram illustrating the structure of a POE system in a Mid span mode in the prior art. As shown in FIG. 3, the PSE unit 11 in this system is configured in a mid-span device 40, and the direct current power outputted by the PSE unit 11 is applied between the two spare pairs 24. Thus, the PD 31 needs to obtain the power from the two spare pairs 24.

In the above three solutions, whether the data pairs or the spare pairs are used to bear the power, the device where the PSE unit 11 is located is directly connected with the device where the PD unit 31 is located via a cable. Therefore, when at least one of the device where the PSE unit 11 is located and the device where the PD unit 31 is located is a conventional Ethernet device and a working distance between them is longer than 100 meters, it is impossible to provide the power to the PD by adopting the existing POE systems.

To sum up, in the existing Ethernet systems, if at least one of two Ethernet devices is a conventional Ethernet device and the working distance between the two Ethernet devices is longer than 100 meters, the two Ethernet devices cannot exchange data normally and cannot provide power to the Ethernet by adopting the exiting POE technology.

SUMMARY OF THE INVENTION

Embodiments of the present invention provide a long-reach Ethernet system, so as to realize the communication of two Ethernet devices when at least one of the two Ethernet devices is a conventional Ethernet device and a working distance between the two Ethernet devices is longer than 100 meters.

The embodiments of the present invention also provide a relay in the long-reach Ethernet system, so as to realize the communication of two Ethernet devices when at least one of the two Ethernet devices is a conventional Ethernet device and a working distance between the two Ethernet devices is longer than 100 meters.

The relay includes a conventional Ethernet interface unit, a data relaying unit and a long-reach Ethernet interface unit;

the conventional Ethernet interface unit is connected with an outside conventional Ethernet link and is adapted to perform conventional Ethernet physical layer processing for received bi-directional Ethernet data;

the data relaying unit is adapted to transmit Ethernet data from the conventional Ethernet interface unit to the long-reach Ethernet interface unit and transmit Ethernet data from the long-reach Ethernet interface unit to the conventional Ethernet interface unit; and the long-reach Ethernet interface unit is connected with an outside long-reach Ethernet link and is adapted to perform long-reach Ethernet physical layer processing for received bi-directional Ethernet data.

The long-reach Ethernet system includes a first Ethernet device and a second Ethernet device which communicate with each other, and a relay described in the above; wherein one of the first Ethernet device and the second Ethernet device is a conventional Ethernet device, and the other one of the first Ethernet device and the second Ethernet device is a conventional Ethernet device or a long-reach Ethernet device;

the first Ethernet device and the second Ethernet device communicate with each other via the relay.

It can be seen from the above technical solution that, the relay provided by the embodiments of the present invention is able to transform conventional Ethernet data into long-reach Ethernet data and vice versa. Therefore, after a conventional Ethernet device is connected with a long-reach Ethernet device via the relay, the relay can transform the data received from the conventional Ethernet device into long-reach Ethernet data which can be transmitted remotely in a link, so as to realize the communication of two ends when at least one of them is a conventional Ethernet device and the working distance between them is longer than 100 meters.

DETAILED DESCRIPTION OF THE INVENTION

Embodiments of the present invention provide a long-reach Ethernet system. The system includes two Ethernet devices, one of them is a conventional Ethernet device and the other one is a conventional Ethernet device or a long-reach Ethernet device. There is a long-reach Ethernet link and a conventional Ethernet link between the two Ethernet devices. The conventional Ethernet link is connected with the long-reach Ethernet link via a relay. The conventional Ethernet device is connected with the conventional Ethernet link and the long-reach Ethernet device is connected with the long-reach Ethernet link. The relay is adapted to transform conventional Ethernet data on the conventional Ethernet link into long-reach Ethernet data on the long-reach Ethernet link and transform long-reach Ethernet data on the long-reach Ethernet link into conventional Ethernet data on the conventional Ethernet link. The two Ethernet devices communicate with each other via the relay.

When the two Ethernet devices are both conventional Ethernet devices, there are two conventional Ethernet links, one long-reach Ethernet link and two relays between the two Ethernet devices. When one of the two Ethernet devices is a conventional Ethernet device and the other one is a long-reach Ethernet device, there is one conventional Ethernet link, one long-reach Ethernet link and a relay between the two Ethernet devices.

It can be seen from the above that, due to the use of the relay, the long-reach Ethernet system including the conventional Ethernet devices may further include a long-reach Ethernet link which can prolong the working distance of the Ethernet devices. Therefore, even if the two communication ends of the Ethernet system are of different types or are both conventional Ethernet devices, the long-reach communication can still be realized.

Preferably, when one of the two Ethernet devices performing long-reach communication is an Ethernet power sourcing device and the other one is an Ethernet powered terminal, the relay is further adapted to transmit power provided by the Ethernet power sourcing device to the Ethernet powered terminal. Thus, due to the use of the relay, the Ethernet power sourcing device is able to provide the power to the Ethernet powered terminal. In this case, the conventional Ethernet link and the long-reach Ethernet link bear the Ethernet data and the power at the same time.

Hereinafter, by taking an example that one of the two Ethernet devices performing long-reach communication is a power sourcing device and the other one is a powered device, the long-reach Ethernet system provided by the embodiments of the present invention is described in detail.

Figure 4:
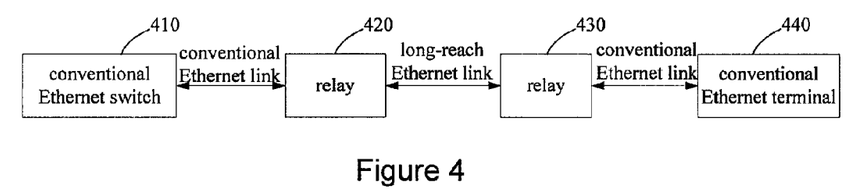
FIG. 4 is a schematic diagram illustrating the structure of a long-reach Ethernet system in which an Ethernet powered terminal is a conventional Ethernet terminal and an Ethernet power sourcing device is a conventional Ethernet switch according to an embodiment of the present invention.

FIG. 4 is a schematic diagram illustrating the structure of a long-reach Ethernet system in which the Ethernet powered terminal is a conventional Ethernet terminal and the Ethernet power sourcing device is a conventional Ethernet switch according to an embodiment of the present invention. As shown in FIG. 4, the system includes: a conventional Ethernet switch 410, a relay 420, a relay 430 and a conventional Ethernet terminal 440. The conventional Ethernet switch 410 is connected with the relay 420 via a conventional Ethernet link, the relay 420 is connected with the relay 430 via a long-reach Ethernet link, and the relay 430 is connected with the conventional Ethernet terminal 440 via a conventional Ethernet link. The Ethernet links adopts cables as transmission media to bear Ethernet data and power.

The conventional Ethernet switch 410 in FIG. 4 receives and transmits conventional Ethernet data via the conventional Ethernet link and puts the power to the conventional Ethernet link. The relay 420 performs transformation between the conventional Ethernet data and the long-reach Ethernet data, obtains the power from the conventional Ethernet link between the conventional Ethernet switch 410 and the relay 420, and puts the power to the long-reach Ethernet link between the relay 420 and the relay 430. The relay 430 has similar functions with the relay 420. The difference lies in that, the processing of the relay 430 for the power includes: transmitting the power received from the long-reach Ethernet link to the conventional Ethernet link. The conventional Ethernet terminal 440 receives and transmits conventional Ethernet data via the conventional Ethernet link between the conventional Ethernet terminal 440 and the relay 430, and obtains the power from the conventional Ethernet link.

Figure 5:
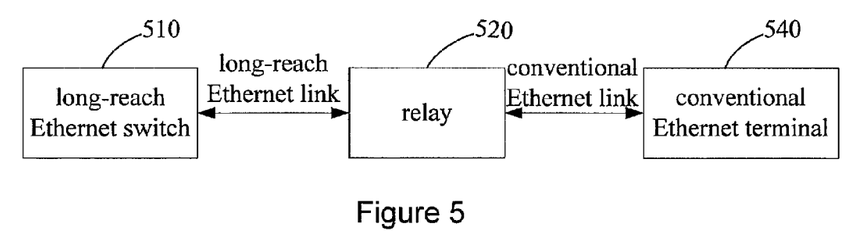
FIG. 5 is a schematic diagram illustrating the structure of a long-reach Ethernet system in which an Ethernet powered terminal is a conventional Ethernet terminal and an Ethernet power sourcing device is a long-reach Ethernet switch according to an embodiment of the present invention.

FIG. 5 is a schematic diagram illustrating the structure of a long-reach Ethernet system in which the Ethernet powered terminal is a conventional Ethernet terminal and the Ethernet power sourcing device is a long-reach Ethernet switch according to an embodiment of the present invention. As shown in FIG. 5, the system includes: a long-reach Ethernet switch 510, a relay 520 and a conventional Ethernet terminal 540. The long-reach Ethernet switch 510 is connected with the relay 520 via a long-reach Ethernet link, and the relay 520 is connected with the conventional Ethernet terminal 540 via a conventional Ethernet link.

The relay 520 has the same functions as the relay 430 shown in FIG. 4, and the conventional Ethernet terminal 540 has the same functions as the conventional Ethernet terminal 440 shown in FIG. 4. The long-reach Ethernet switch 510 shown in FIG. 5 receives and transmits long-reach Ethernet data via a long-reach Ethernet link, and puts power to the conventional Ethernet link.

The Ethernet switches acting as a power sourcing end shown in FIG. 4 and FIG. 5 may be implemented by referring to the network switch devices having a PSE unit shown in FIG. 1 and FIG. 2. Alternatively, the PSE may be configured in the intermediate device by referring to FIG. 3. Thus, the Ethernet switch and the intermediate device having a PSE unit constitute an Ethernet power sourcing device together.

Figure 6:
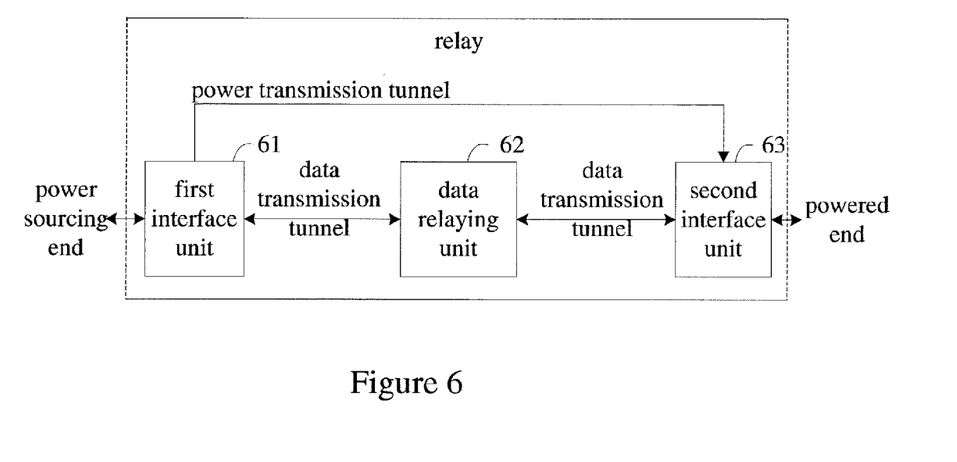
FIG. 6 is a schematic diagram illustrating the structure of a relay according to an embodiment of the present invention.

Hereinafter, the structure of the relay which implements the relaying of the Ethernet data and the power will be described in detail. FIG. 6 is a schematic diagram illustrating the structure of a relay according to an embodiment of the present invention. As shown in FIG. 6, the relay includes: a first interface unit 61, a data relaying unit 62 and a second interface unit 63. The first interface unit 61 is connected with a cable of a power sourcing end outside the relay, is connected with the data relaying unit 62 via a data transmission tunnel inside the relay, and is connected with the second interface unit 63 via a power transmission tunnel inside the relay. The second interface 63 is connected with a cable of a powered end outside the relay and is connected with the data relaying unit 62 via a data transmission tunnel inside the relay. The first interface unit 61 is one of a long-reach Ethernet interface unit and a conventional Ethernet interface unit, and the second interface unit 63 is the other one of the long-reach Ethernet interface unit and the conventional Ethernet interface unit. That is to say, if the first interface unit 61 is the long-reach Ethernet interface unit, the second interface unit 63 is the conventional Ethernet interface unit; if the first interface unit 61 is the conventional Ethernet interface unit, the second interface unit 63 is the long-reach Ethernet interface unit.

The first interface unit 61 is adapted to perform physical layer processing for received bi-directional Ethernet data according to the interface type of the first interface unit 61, and transmit power received from the power sourcing end to the second interface unit 63 via the power transmission tunnel. The bi-directional Ethernet data refer to Ethernet data obtained from the cable and Ethernet data received from the data relaying unit 62.

The data relaying unit 62 is adapted to transmit the Ethernet data received from the first interface unit 61 to the second interface unit 63 and transmit the Ethernet data received from the second interface unit 63 to the first interface unit 61. Data transmission is a basic work of the data relaying unit 62. In practical applications, the data relaying unit 62 may be responsible for other tasks such as form-shaping of data signals according to practical requirements.

The second interface unit 63 is adapted to perform physical layer processing for received bi-directional Ethernet data according to the interface type of the first interface unit 63 and put power received from the power transmission tunnel to the cable so as to transmit the power to the powered end.

When the first interface unit or the second interface unit is a long-reach Ethernet interface unit, the long-reach Ethernet interface unit is connected with an outside long-reach Ethernet link and is adapted to perform long-reach Ethernet physical layer processing for the received bi-directional Ethernet data. Specifically, the long-reach Ethernet interface unit performs long-reach physical layer decoding for the long-reach Ethernet data obtained from the outside cable and transmits the decoded long-reach Ethernet data to the data relaying unit 62; and performs long-reach physical layer encoding for the Ethernet data received from the data relaying unit 62 and transmits the encoded Ethernet data to the outside cable. The long-reach Ethernet interface unit also transmits the power received from the cable to the conventional Ethernet interface unit via the power transmission tunnel.

When one or two twisted pairs in the cable are adopted as data pairs, the long-reach Ethernet physical layer processing includes encoding/decoding the Ethernet data by using a 3B2T transformation encoding method and a PAM-3 link encoding method. When four twisted pairs in the cable are adopted as the data pairs, the long-reach Ethernet physical layer processing includes encoding/decoding the Ethernet data by using an 8B1Q4 transformation encoding method and a PAM-5 link encoding method. Through the above encoding operations, the conventional Ethernet data are transformed into long-reach Ethernet data. The code rate after the transformation is much lower than that of the conventional Ethernet data. The decrease of the code rate results in the increase of the transmission distance of the long-reach Ethernet data.

When the first interface unit or the second interface unit is a conventional Ethernet interface unit, the conventional Ethernet interface unit is connected with an outside conventional Ethernet link and is adapted to perform conventional Ethernet physical layer processing for the received bi-directional Ethernet data and put the power received from the power transmission tunnel to the cable. The conventional Ethernet physical layer processing is well-known in the prior art and will not be described herein.

Hereinafter, the implementation of each module in the relay shown in FIG. 6 will be described in detail with reference to multiple embodiments and by taking an example that the first interface unit 61 is a long-reach Ethernet interface unit and the second interface unit 63 is a conventional Ethernet interface unit. The relay may be used as the relay 430 in FIG. 4 or the relay 520 in FIG. 5.

A First Embodiment

In this embodiment, spare pairs in the cable are adopted to transmit power. The conventional Ethernet interface works in a 2-twisted-pair mode, i.e. the conventional Ethernet interface adopts 2 twisted pairs to transmit Ethernet data. The long-reach Ethernet interface also works in the 2-twisted-pair mode.

Figure 7:
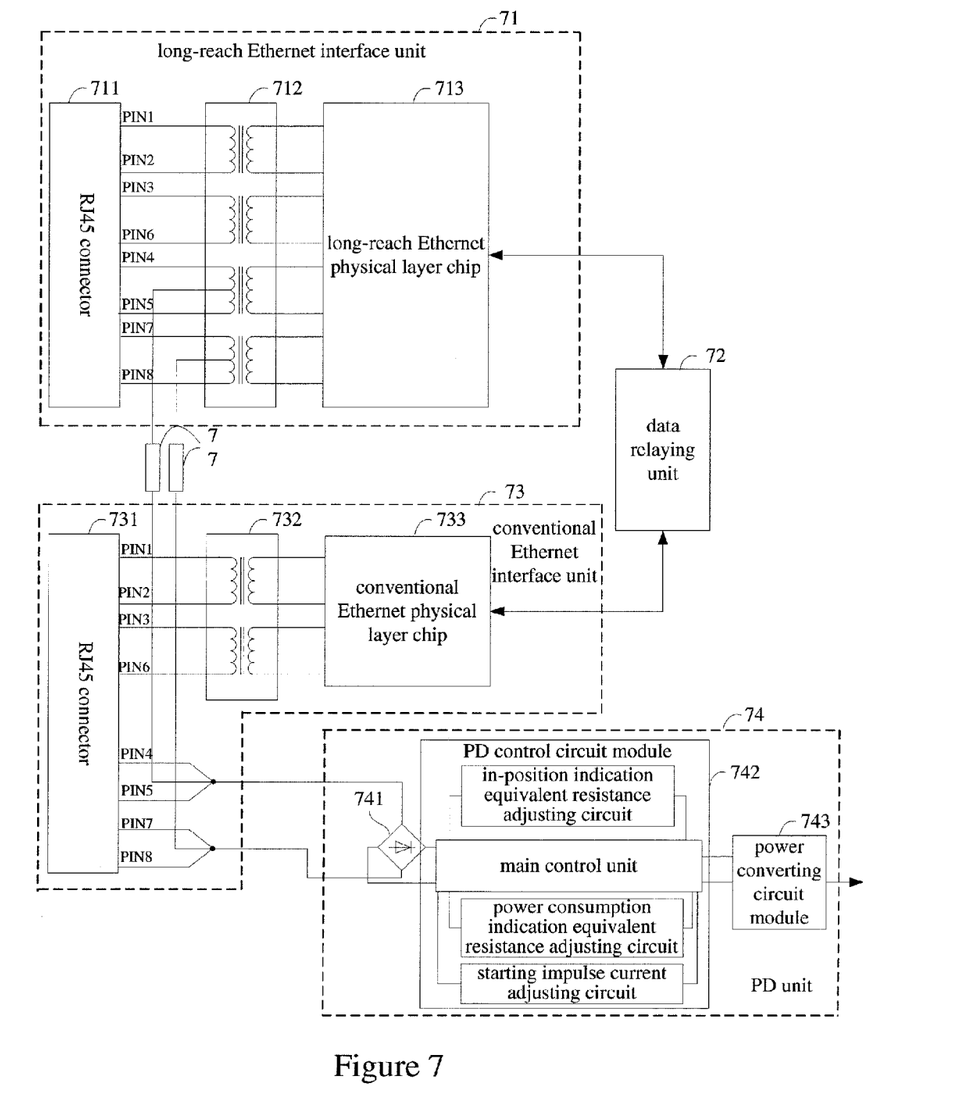
FIG. 7 is a schematic diagram illustrating the structure of a relay according to a first embodiment of the present invention.

FIG. 7 is a schematic diagram illustrating the structure of a relay according to the first embodiment. As shown in FIG. 7, the relay includes: a long-reach Ethernet interface unit 71, a data relaying unit 72 and a conventional Ethernet interface unit 73. The data relaying unit 72 has the same functions as the data relaying unit shown in FIG. 6 and will not be described in detail herein.

The long-reach Ethernet interface unit 71 includes an RJ45 connector 711, a transformer group 712 and a long-reach Ethernet physical layer chip 713. The conventional Ethernet interface unit 73 includes an RJ45 connector 731, a transformer group 732 and a conventional Ethernet physical layer chip 733.

8 pins of the RJ45 connector 711 are respectively connected with 8 wires of a cable for bearing the long-reach Ethernet link. In this embodiment, since the long-reach Ethernet interface works in the 2-twisted-pair mode, 1/2 pins and 3/6 pins of the RJ45 connector 711 correspond to the data pairs and are used for bearing the long-reach Ethernet data; and 4/5 pins and 7/8 pins correspond to the spare pairs and are used for bearing the power.

The transformer group 712 is adapted to couple the data pairs in the RJ45 connector 711 to the distance-enhance Ethernet physical layer chip 713 so as to transmit Ethernet data to the long-reach Ethernet physical layer chip 713, and adapted to transmit the Ethernet data transformed by the long-reach physical layer chip 713 to the long-reach Ethernet link. The transformer group 712 is further adapted to connect the spare pairs in the RJ45 connector 711 to the wire pairs for bearing the power in the RJ45 connector 731 of the conventional Ethernet interface unit, so as to provide a power transmission tunnel for transmitting the power to realize the relaying of the power.

Specifically, as shown in FIG. 7, the transformer group 712 in this embodiment includes 4 transformers, and the transformer group 732 in this embodiment includes 2 transformers. In the transformer group 712, the transformers respectively connected with the 1/2 pins and the 3/6 pins are used for bearing the Ethernet data, the transformers respectively connected with the 4/5 pins and the 7/8 pins are used for bearing the power, and two center taps of the two transformers for bearing the power are respectively connected with the two spare pairs in the transformer group 732. It can be seen from FIG. 7 that, the transformer group 712 further couples the wire pairs respectively corresponding to the 4/5 pins and the 7/8 pins in the RJ45 connector 711 to the long-reach physical layer chip 713. But the long-reach Ethernet physical layer chip 713 does not process these two paths of signals. The connection herein is to make the long-reach Ethernet physical layer chip 713 obtain the Ethernet data from the wire pairs corresponding to the 4/5 pins and the 7/8 pins when the long-reach Ethernet physical layer chip 713 works in a 4-twisted-pair mode.

The transformer groups provide coupling and connection functions. Those skilled in the art should understand that a coupling device may be any coupler capable of realizing an alternating current coupling effect.

Preferably, an isolation inductor 77 may be added in the power transmission tunnel for transmitting the power, so as to realize the put-through of low frequency direct current power and the isolation of high frequency Ethernet signals.

8 pins of the RJ45 connector 731 are respectively connected with 8 wires in a cable for bearing the conventional Ethernet link. The conventional Ethernet interface unit 73 works in the 2-twisted-pair mode, and thus, the 1/2 pins and the 3/6 pins of the RJ45 connector 731 correspond to the data pairs and are used for bearing the Ethernet data, the 4/5 pins and the 7/8 pins correspond to the spare pairs and are used for bearing the power. It has been mentioned in the description of the transformer group 712 that, the spare pairs of the RJ45 connector 731 are connected with the center taps of the transformers for bearing the power in the transformer group 712.

The transformer group 732 is adapted to couple the data pairs in the RJ45 connector 731 to the conventional Ethernet physical layer chip 733 so as to transmit outside conventional Ethernet data to the conventional Ethernet physical layer chip 733, and adapted to transmit conventional Ethernet data processed by the conventional Ethernet physical layer chip 733.

The long-reach Ethernet physical layer chip 713 is adapted to perform long-reach Ethernet physical layer processing for received bi-directional Ethernet data.

The conventional Ethernet physical layer chip 733 is adapted to perform conventional Ethernet physical layer processing for received bi-directional Ethernet data.

The relay in this embodiment may be powered by an outside power source. Since the relay has very low power consumption, it may be taken as a special powered device and called as an additional PD device. One or more additional PD devices are powered by the Ethernet switch in the system together with a conventional powered device. In this case, the relay acting as an additional PD device further includes a PD unit 74, adapted to receive the power from the power transmission tunnel between the conventional Ethernet interface and the long-reach Ethernet interface, and adapted to convert the voltage of the received power into a working voltage of the relay and take the power as working power of the relay. The structure of the PD unit 74 is the same as that of the PD unit 31 in the existing POE systems shown in FIG. 1 to FIG. 3. Specifically, the PD unit 74 includes a rectifier 741, a PD control circuit module 742 and a PD power converting circuit module 743.

The rectifier 741 is adapted to rectify the power received from the power transmission tunnel to make the voltage direction of the power fixed.

The PD control circuit module 742 is adapted to provide the power rectified by the rectifier 741 to the power converting circuit module 743, and cooperate with the Ethernet power sourcing device to finish PD detection. As to a system having a relay, the objects of the PD detection are the conventional Ethernet terminals shown in FIG. 4 and FIG. 5. The PD detection includes PD in-position detection, PD power consumption detection and power-on slow start during a power supply starting-up phase.

The power converting circuit module 743 is adapted to convert the voltage of the power provided by the Ethernet power sourcing device into a working voltage of the device where the power converting circuit module 743 is located and provide the power to the device as working power.

In the PD unit 74, the PD control circuit module 742 is an important unit for cooperating with the Ethernet power sourcing device to finish the PD detection. Hereinafter, the PD control circuit module 742 in this embodiment will be described in detail.

The PD control circuit module 742 includes a main control circuit and an in-position equivalent resistance adjusting circuit. Optionally, the PD control circuit module 742 may further include a power consumption indication equivalent current adjusting circuit and a pulse current initiation adjusting circuit.

The main control circuit is adapted to provide the rectified power to the power converting circuit module 743 to realize control operations such as slow starting-up switch in the PD detection, which are the same as those in the prior art and will not be described herein.

Different configurations of the in-position equivalent resistance adjusting circuit may make the PD control circuit module 742 (or the PD unit), where the in-position equivalent resistance adjusting circuit is located, present in-position detection equivalent resistances with different values during a PD in-position detection phase.

Different configurations of the power consumption indication equivalent current adjusting circuit may make the PD control circuit module 742, where the power consumption indication equivalent current adjusting circuit is located, present different power consumption detection equivalent currents during a PD power consumption detection phase.

Different configurations of the starting impulse current adjusting circuit may restrict a maximum starting impulse current of the PD control circuit module 742, where the starting impulse current adjusting circuit is located. Depending on the configuration of the starting impulse current adjusting circuit, the PD control circuit module may, provide different maximum starting impulse current values during a power-on starting-up phase.

Reasonable configurations of the three adjusting circuits enable the Ethernet powered terminal to cooperate with the power sourcing equipment to respectively accomplish the PD in-position detection, PD power consumption type recognizing and power-on slow start in the PD detection. In practical applications, adjustable resistances may be adopted as the adjusting circuits. Those skilled in the art should understand that the above adjusting circuits may be implemented by using any adjustable electronic apparatuses which can perform resistance and current adjustment and are not restricted to be the adjustable resistances.

Hereinafter, embodiments will be given to describe how to configure the three adjusting circuits reasonably.

Figure 8:
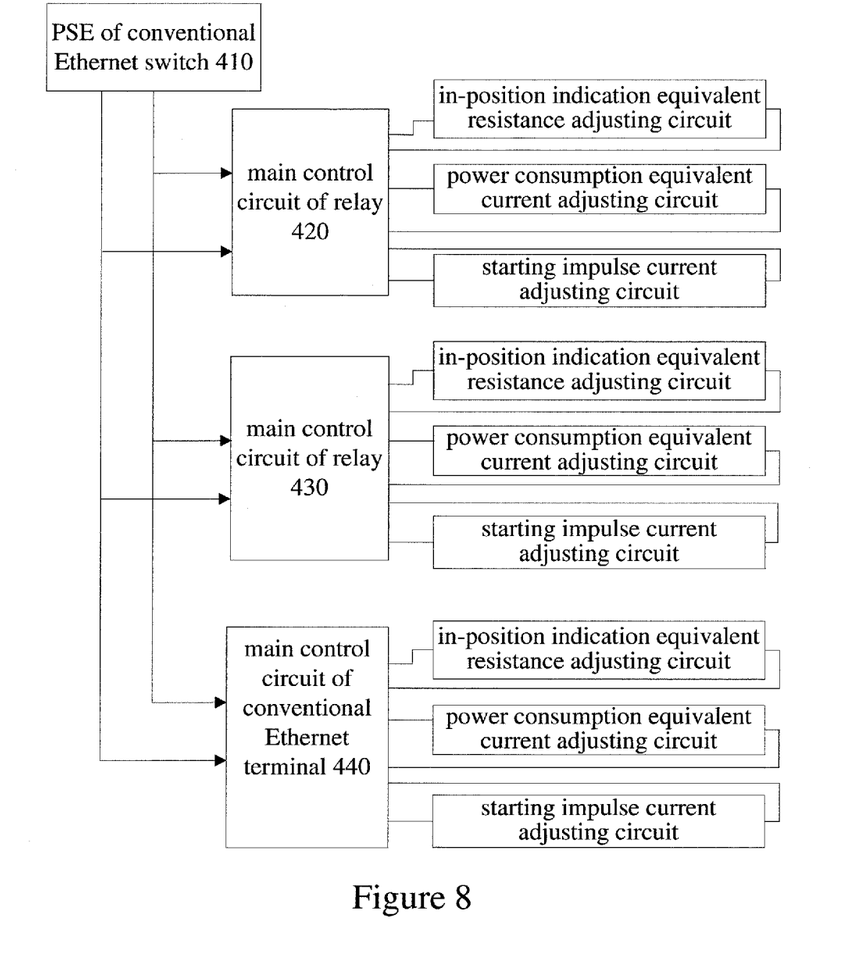
FIG. 8 is a schematic diagram illustrating a situation in which relays 420 and 430 and a conventional Ethernet terminal 440 in FIG. 4 act as an Ethernet powered load according to an embodiment of the present invention.

In the embodiments of the present invention, when the relay is powered by the Ethernet, one or two relays act as a powered terminal together with the Ethernet terminal, which is equivalent to a situation that the relay and the Ethernet terminal are connected in parallel to form a powered load. Take a situation that two relays relay data and power from a conventional Ethernet switch device to a conventional Ethernet terminal shown in FIG. 4 as an example. FIG. 8 is a schematic diagram illustrating a situation in which the relays 420 and 430 act as the powered load together with the conventional Ethernet terminal 440. It should be noted that, FIG. 8 is only a load schematic diagram but not a system structure schematic diagram. As shown in FIG. 8, since the two relays and the PD unit of the conventional Ethernet terminal are connected in parallel to form the powered load, the PD units of all the relays in the system and the PD unit of the Ethernet terminal are connected in parallel to form a combined PD. The combined PD should conform to IEEE802.3af, i.e. PD detection parameters including the in-position indication equivalent resistance, the power consumption indication equivalent current and the starting impulse current of the combined PD should meet the requirements of IEEE802.3af.

However, since the combined PD is formed by connecting multiple PD units in parallel, if the in-position indication equivalent resistances of two relays and the Ethernet terminal are all configured as a value defined by IEEE802.3af, the three in-position indication equivalent resistances with the same value defined by IEEE802.3af will be equivalent to a resistance with 1/3 defined value after the three in-position indication equivalent resistances are connected in parallel. Under this configuration, if the equivalent resistance of the three in-position indication equivalent resistances is taken as an equivalent resistance value of the conventional Ethernet terminal 440 which is an object to be detected, the PD detection will become invalid. In addition, after the three in-position indication equivalent resistances are connected in parallel, a total power consumption indication equivalent current value and a total starting impulse current value are respectively equal to the sum of those of the three in-position indication equivalent resistances and are much larger than those when there is only one load, which may result in power consumption type recognizing error and starting impulse current overflow.

In this embodiment, the special configurations of the adjusting circuits of the PD control circuit module 742 may avoid the above problems including PD detection invalidation, power consumption type recognizing error and starting impulse current overflow. Hereinafter, the configuration of each adjusting circuit will be described in detail with reference to the analysis of several phases of the PD detection.

1. PD in-position detection: the PSE at the conventional Ethernet switch 410 side detects whether the conventional Ethernet terminal 440 is in position before providing power.

Figure 9:
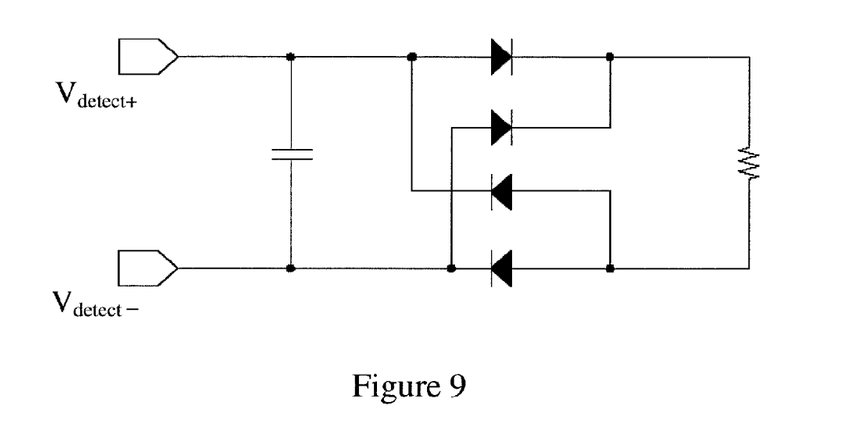
FIG. 9 is a schematic diagram illustrating an Ethernet power sourcing equivalent load model during in-position detection according to an embodiment of the present invention.

According to the specification of IEEE802.3af-2003, during the PD in-position detection, an Ethernet power sourcing equivalent load module is as shown in FIG. 9. The powered load is equivalent to an equivalent resistance and an equivalent capacitance which are connected in parallel. Four diodes in FIG. 9 represent a rectifier. At this time, the PSE outputs in-position detection direct current voltages $V_{detect+}$ and $V_{detect-}$ whose values are between 2.8V and 10V, and detects the values of the equivalent resistance and the equivalent capacitance; if the value of the equivalent resistance is between 19K ohm and 26.5K ohm and the value of the equivalent capacitance is smaller than 150 nF, it is indicated that the PD is in position. During the PD in-position detection phase, the equivalent resistance is called as the in-position indication equivalent resistance.

However, in the embodiment of the present invention, the powered load further includes the PD unit of the relay. It has been mentioned above that, the value of parallelized in-position indication equivalent resistance is much smaller than that of the in-position indication equivalent resistance of the Ethernet terminal, and the value of parallelized equivalent capacitance is larger than that of a single equivalent capacitance of the Ethernet terminal, which influences the accuracy of the in-position detection of the conventional Ethernet terminal 440.

In order to decrease the influence of the relays on the PD in-position detection, in the embodiments of the present invention, the in-position equivalent resistance adjusting circuit of each relay is adjusted to make the PD unit where it is located present a pre-defined equivalent resistance value during the PD in-position detection phase. The pre-defined equivalent resistance value makes the in-position indication equivalent resistance of the combined PD meet the requirements of IEEE802.3af.

Specifically, the in-position equivalent resistance adjusting circuit is adjusted to make the in-position indication equivalent resistance of the relay much larger than 26.5K ohm, e.g. larger than 265K ohm. In practical applications, an adjustable in-position indication resistance Rw may be adopted as the in-position equivalent resistance adjusting circuit. Simply, the in-position equivalent resistance adjusting circuit is configured to be 470K. Thus, the parallel in-position indication equivalent resistances of the two relays and the conventional Ethernet terminal are basically the same as the in-position indication equivalent resistance of the conventional Ethernet terminal 440. In addition, the equivalent capacitance of each relay may be configured to be much smaller than 150 nF. Thus, it is possible to connect a capacitance with a value smaller than 10 nF, e.g. 2 nF, or not to use any capacitance, at the input end of the PD control circuit module. Thus, the parallelized equivalent capacitance will be basically the same as the equivalent capacitance of the conventional Ethernet terminal 440.

In view of the above, through the configurations of the in-position resistance adjusting circuit and the parallelized capacitance at the input end of the PD control circuit module, the in-position indication equivalent resistance and the equivalent capacitance of the relay will not influence the in-position indication equivalent resistance and the equivalent capacitance of the conventional Ethernet terminal 440. Thus, The PSE is able to accurately determine whether the conventional Ethernet terminal 440 is in position.

2. PD power consumption detection: optionally, before providing power, the PSE at the conventional Ethernet switch 410 side may further recognize the power consumption type required by the conventional Ethernet terminal 440.

Figure 10:
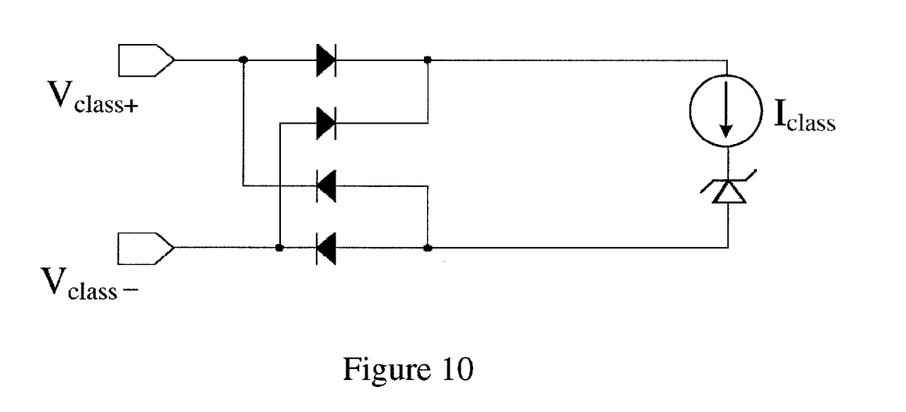
FIG. 10 is a schematic diagram illustrating an Ethernet power sourcing equivalent load model during load power consumption recognition according to an embodiment of the present invention.

According to the specification of IEEE802.3af-2003, an Ethernet power sourcing equivalent load model during a load power consumption type recognizing procedure is as shown in FIG. 10. The powered load is equivalent to an equivalent current source and a voltage stabilizer which are connected in serial. The equivalent current source is called as a power consumption indication equivalent current $I_{class}$. The four diodes shown in FIG. 10 represent a rectifier. The PSE outputs power consumption recognizing direct current voltages $V_{class+}$ and $V_{class-}$ whose values are between 15.5V and 20.5V, and restricts a maximum output current to be 100 mA at the same time. At this time, the voltage of the voltage stabilizer is maintained between 10.1V to 14.5V. The PSE determines load power consumption requirements according to the value of $I_{class}$ and determines a power source consumption to be provided according to the load power consumption requirements.

However, in the embodiments of the present invention, the powered load further includes the PD unit of the relay. It has been mentioned above that, the parallel total power consumption indication equivalent current is larger than the power consumption indication equivalent current of the conventional Ethernet terminal 440, which influences the accuracy of the load power consumption type recognition.

In order to decrease the influence of the relays on the load power consumption type recognition, in the embodiments of the present invention, the power consumption indication equivalent current adjusting circuit of each relay is adjusted, so as to make the PD unit where the relay is located present a pre-defined equivalent current value during the PD power consumption detection phase. The pre-defined equivalent current value makes the power consumption indication equivalent current of the combined PD meet the requirements of IEEE802.3af.

Specifically, the power consumption indication equivalent current adjusting circuit is adjusted to make the power consumption indication equivalent current of each relay close to 0 mA, e.g. smaller than 0.5 mA. In practical applications, an adjustable power consumption indication resistance Rp may be adopted as the power consumption indication current adjusting circuit of each relay. Preferably, the power consumption indication equivalent current of each relay may be adjusted to be 0.25 mA through the configuration of Rp. Thus, the parallel power consumption indication equivalent current of the two relays and the conventional Ethernet terminal will be basically the same as the power consumption indication equivalent current of the conventional Ethernet terminal 440. The value of the Rp is relevant to the detailed hardware structure of the relay and may be determined according to experiments.

In view of the above, through the configuration of the power consumption indication equivalent current adjusting circuit, the power consumption indication equivalent current of the relay will not influence the power consumption indication equivalent current of the conventional Ethernet terminal 440. Thus, the PSE is able to accurately determine the power consumption type of the conventional Ethernet terminal 440.

3. Slow Start

According to the specification of IEEE802.3af-2003, the equivalent capacitance of the powered load should not exceed 180 μF during the power-on phase; otherwise, the slow start is required.

However, in the embodiments of the present invention, the powered load further includes the PD unit of the relay. It has been mentioned above that, the parallel equivalent capacitance is larger than the equivalent capacitance of the conventional Ethernet terminal and thus influences the determination of whether the slow start needs to be performed.

In order to decrease the influence of the relay on the slow start determination, in the embodiments of the present invention, the starting impulse current adjusting circuit of each relay is adjusted to make the starting impulse current of the PD unit where the relay is located smaller than a pre-defined maximum starting current value during the power-on phase. The pre-defined maximum starting current value makes the starting impulse current of the combined PD meet the requirements of IEEE802.3af.

Specifically, the starting impulse current adjusting circuit is adjusted to make the starting impulse current of each relay much smaller than that generated by an 180 μf equivalent capacitance, e.g. smaller than that generated by an 18 μF equivalent capacitance. In practical applications, an adjustable starting impulse current adjusting resistance Rc may be adopted as the starting impulse current adjusting circuit. Preferably, the Rc is configured to make the starting impulse current of each relay equal to that generated by a 10 μF load capacitance. The value of the Rc is relevant to the detailed hardware structure of the relay and may be determined according to experiments.

4. Real-time load detection: after providing the power, the PSE detects the state of the powered load in real time. If the state is abnormal, e.g. overflow, load disconnected etc., the PSE shuts off the power at once and provide power again.

According to the specification of IEEE802.3af-2003, after the PSE provides the power, the equivalent current of the powered load should be larger than 10 mA, the equivalent resistance should be smaller than 16.25K ohm and the equivalent capacitance should be larger than 0.05 g. Generally, the parallel load of the two relays and the conventional Ethernet terminal 440 is able to meet this requirements and no special processing is required.

It should be noted that the power consumption of each relay is usually smaller than 0.5 W. The two relays occupy a small part of the total power consumption provided by the PSE and the loss of long distance cable is also increased. Thus, a maximum available power consumption of the conventional Ethernet terminal will be decreased. In view of this, some measures may be adopted to compensate the loss of the long distance cable, so as to maintain the available power consumption of the Ethernet powered terminal. For example, the output voltage of the PSE is increased and power is provided via 4 wire pairs. Those skilled in the art can easily understand the combinations of these improvement measures and the embodiments of the present invention, which will not be described herein.

In the above first embodiment, the relay is described by taking an example that the first interface unit is the long-reach Ethernet interface. Since the power transmission tunnel in the relay is an electrical tunnel and has no direction restriction, the RJ45 connector 711 may be connected with either the power sourcing end or the powered end. Thus, the relay may also be the relay 430 shown in FIG. 4.

The first embodiment describes the structure of the relay in which both the long-reach Ethernet interface and the conventional Ethernet interface adopt the data pairs to transmit the Ethernet data and adopt the spare pairs to transmit the power.

In a second embodiment of the present invention, the long-reach Ethernet interface of the relay adopts the data pairs to transmit the Ethernet data and adopts the spare pairs to transmit the power, whereas the conventional Ethernet interface adopts the data pairs to transmit both the Ethernet data and the power. The structure of the relay in the second embodiment is similar to that shown in FIG. 7. The difference lies in that, in the second embodiment, the center taps of the two transformers for bearing the power in the transformer group 712 are respectively connected with the center taps of the two transformers in the transformer group 732.

Figure 11:
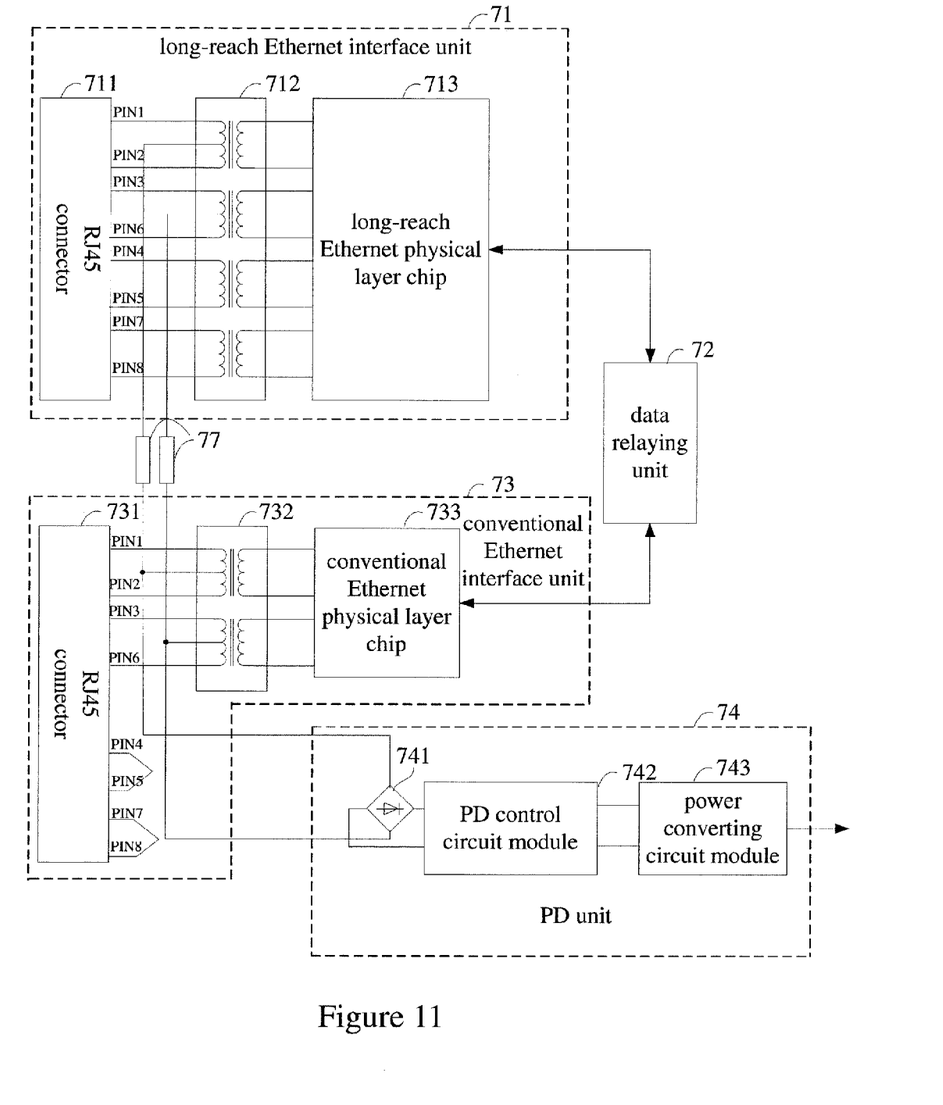
FIG. 11 is a schematic diagram illustrating the structure of a relay according to a third embodiment of the present invention.

In a third embodiment of the present invention, both the long-reach Ethernet interface and the conventional Ethernet interface may adopt the data pairs to transmit the Ethernet data and the power. FIG. 11 is a schematic diagram illustrating the structure of a relay according to the third embodiment of the present invention. As shown in FIG. 11, different from the first embodiment, the data pairs in the long-reach Ethernet interface unit 71 bear the Ethernet data and the power. The center taps of the transformers connected with the data pairs are connected with the center taps of the transformers connected with the data pairs in the conventional Ethernet interface unit 73.

Certainly, it is also possible that the long-reach Ethernet interface adopts the data pairs to transmit the Ethernet data and the power and the conventional Ethernet interface adopts the spare pairs to transmit the Ethernet data and the power. In this case, the center taps in the transformers connected with the data pairs in the long-reach Ethernet interface unit 71 are connected with the twisted pairs of the spare pairs in the conventional Ethernet interface unit 73.

In practical applications, the long-reach Ethernet interface may also work in a 1-twisted-pair mode or the 4-twisted-pair mode. When the long-reach Ethernet interface works in the 4-twisted-pair mode and the 4 twisted pairs are all data pairs, the power has to share the same wire pairs with the Ethernet data.

It can be seen from above that, whichever mode the long-reach Ethernet interface and the conventional Ethernet interface in the relay work in, and whether the data pairs or the spare pairs are adopted to transmit the power, if only one interface in the relay transmits the Ethernet data obtained from the wire pairs for bearing the Ethernet data to the other interface via the data relaying unit and directly transmits the power received from the wire pairs for bearing the power via the other interface, the relaying of the Ethernet data and the power is realized. Thus, the wire pairs for bearing the Ethernet data and the wire pairs for bearing the power may be the same or different pairs.

It should be noted that, the working modes of the long-reach Ethernet interface and the conventional Ethernet interface and whether the data pairs or the spare pairs are adopted to transmit the power should correspond to the Ethernet device connected with the interface. For example, both the long-reach Ethernet switch 510 and the conventional Ethernet terminal 540 shown in FIG. 5 work in the 2-twisted-pair mode; if the long-reach Ethernet switch 510 adopts the spare pairs to transmit the power and the conventional Ethernet terminal 540 adopts the data pairs to transmit the power, the relay 520 should adopt the structure described in the second embodiment.

It can be seen from the above embodiments of the present invention that, if there are two relays, it is possible to connect two conventional Ethernet devices, and the long-reach Ethernet data are transmitted between the two relays. Since the long-reach Ethernet data can be transmitted remotely in a link, the communication of two ends can be realized when both of them are conventional Ethernet devices and the working distance between them is longer than 100 meters.

When one of the two Ethernet devices performing long-reach communication is an Ethernet power sourcing device and the other one is an Ethernet powered terminal, the relay is further adapted to transmit power provided by the Ethernet power sourcing device to the Ethernet powered terminal. Due to the use of the relay, the Ethernet power sourcing device can also provide power to the Ethernet powered terminal, so as to realize long-reach Ethernet power supply.

In addition, the embodiments of the present invention further optimize the relay to make the relay act as an additional PD device. One or more relays acting as additional PD devices may act as a combined PD together with a conventional Ethernet powered terminal to accept Ethernet power. In the embodiments of the present invention, through special configurations of the in-position equivalent resistance adjusting circuit, the optional power consumption indication equivalent current adjusting circuit and the optional initiating pulse current adjusting circuit in the relay, problems such as an in-position detection error, a power consumption type recognizing error and power-on starting current overflow which are brought out by taking the relay as the additional powered load can be avoided.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

What is claimed is:

1. A relay, applied to a long-reach Ethernet system comprising two Ethernet devices, wherein a Power Sourcing Equipment (PSE) unit is configured in one of the two Ethernet devices, a Powered Device (PD) unit is configured in the other one of the two Ethernet devices, and the two Ethernet devices communicate with each other via the relay, the relay comprises: a conventional Ethernet interface unit, a data relaying unit, a long-reach Ethernet interface unit, and a power transmission tunnel between the conventional Ethernet interface unit and the long-reach Ethernet interface unit; wherein the conventional Ethernet interface unit is connected with an outside conventional Ethernet link and is configured to perform conventional Ethernet physical layer processing for received bi-directional Ethernet data;

the data relaying unit is configured to transmit Ethernet data from the conventional Ethernet interface unit to the long-reach Ethernet interface unit and transmit Ethernet data from the long-reach Ethernet interface unit to the conventional Ethernet interface unit;

the long-reach Ethernet interface unit is connected with an outside long-reach Ethernet link and is configured to perform long-reach Ethernet physical layer processing for received bi-directional Ethernet data; and the power transmission tunnel is configured to transmit power;

the relay further comprises a PD unit, configured to receive the power from the power transmission tunnel, convert a voltage of the power into a working voltage of the relay and take the power as a working power of the relay;

when the relay acts as a data and power relay of a Powered over Ethernet (POE) system, the PD unit of the relay is connected with a PD unit of an Ethernet powered terminal of the POE system and PD units of other relays in parallel to be equivalent to a combined PD;

the PD unit of the relay comprises a rectifier, a PD control circuit module and a voltage converting circuit module;

the rectifier is configured to rectify the power received from the power transmission tunnel;

the PD control circuit module comprises a main control circuit and an in-position equivalent resistance adjusting circuit;

the main control circuit is configured to provide the rectified power to a power converting circuit module and perform a control operation in PD detection;

the in-position equivalent resistance adjusting circuit is configured to make the PD control circuit module where the in-position equivalent resistance adjusting circuit is located present a pre-defined equivalent resistance value during a PD detection phase, where the pre-defined equivalent resistance value makes an in-position indication equivalent resistance of the combined PD meet requirements of IEEE802.3af; and the power converting circuit module is configured to convert a voltage of the power received from the PD control circuit module into a working voltage of the relay and take the power as the working power of the relay.

2. The relay of claim 1, wherein the long-reach Ethernet interface unit comprises a first connector, a first coupler group and a long-reach Ethernet physical layer chip; the conventional Ethernet interface unit comprises a second connector, a second coupler group and a conventional Ethernet physical layer chip;

the first connector is connected with the outside long-reach Ethernet link;

the first coupler group is configured to couple a wire pair for bearing long-reach Ethernet data in the first connector to the long-reach Ethernet physical layer chip and connect a wire pair for bearing power in the first connector to a wire pair for bearing power in the second connector to form the power transmission tunnel;

the long-reach Ethernet physical layer chip is configured to perform long-reach Ethernet physical layer processing for the received bi-directional Ethernet data;

the second connector is connected with the outside conventional Ethernet link;

the second coupler group is configured to couple a wire pair for bearing conventional Ethernet data in the second connector to the conventional Ethernet physical layer chip; and the conventional Ethernet physical layer chip is configured to perform conventional Ethernet physical layer processing for the received bi-directional Ethernet data.

3. The relay of claim 2, wherein the first coupler group comprises 4 couplers and the second coupler group comprises 2 couplers;

in the first coupler group, two couplers for bearing power are respectively connected with two wire pairs for bearing power in the first connector, center taps of the two couplers for bearing power are respectively connected with center taps of the two couplers in the second coupler groups; or the two center taps of the two couplers for bearing power are respectively connected with two spare wire pairs in the second connector.

4. The relay of claim 2, wherein the wire pair for bearing long-reach Ethernet data and the wire pair for bearing power in the first connector are the same or different; the wire pair for bearing conventional Ethernet data and the wire pair for bearing power in the second connector are the same or different.

5. The relay of claim 1, wherein the power transmission tunnel further comprises an isolation inductance.

6. The relay of claim 1, wherein the PD control circuit module further comprises: a power consumption indication equivalent current adjusting circuit and/or a starting impulse current adjusting circuit;

the power consumption indication equivalent current adjusting circuit is configured to make the PD control circuit module where the power consumption indication equivalent current adjusting circuit is located present a pre-defined equivalent current value during a PD power consumption detection phase, where the pre-defined equivalent current value makes a power consumption indication equivalent current of the combined PD meet the requirements of IEEE802.3af; and the starting impulse current adjusting circuit is configured to make a starting impulse current of the PD control circuit module where the starting impulse current adjusting circuit is located smaller than a pre-defined maximum starting current value during a power-on phase, where the pre-defined maximum starting current value makes an starting impulse current of the combined PD meet the requirements of IEEE802.3af.

7. The relay of claim 6, wherein the pre-defined equivalent resistance value is larger than 265K ohm, the pre-defined equivalent current value is smaller than 0.5 mA and the pre-defined maximum starting current is smaller than a pulse current generated by an 18 μF capacitance.

8. The relay of claim 6, wherein the in-position equivalent resistance adjusting circuit, the power consumption indication equivalent current adjusting circuit and the starting impulse current adjusting circuit are all adjustable resistances.

9. A long-reach Ethernet system, comprising: a first Ethernet device and a second Ethernet device which communicate with each other, and a relay; wherein a Power Sourcing Equipment (PSE) unit is configured in one of the first Ethernet device and the second Ethernet device, and a Powered Device (PD) unit is configured in the other one of the first Ethernet device and the second Ethernet device;

the first Ethernet device and the second Ethernet device communicate with each other via the relay;

the relay comprises: a conventional Ethernet interface unit, a data relaying unit, a long-reach Ethernet interface unit, and a power transmission tunnel between the conventional Ethernet interface unit and the long-reach Ethernet interface unit; wherein the conventional Ethernet interface unit is connected with an outside conventional Ethernet link and is configured to perform conventional Ethernet physical layer processing for received bi-directional Ethernet data;

the data relaying unit is configured to transmit Ethernet data from the conventional Ethernet interface unit to the long-reach Ethernet interface unit and transmit Ethernet data from the long-reach Ethernet interface unit to the conventional Ethernet interface unit;

the long-reach Ethernet interface unit is connected with an outside long-reach Ethernet link and is configured to perform long-reach Ethernet physical layer processing for received bi-directional Ethernet data; and the power transmission tunnel is configured to transmit power;

the relay further comprises: a PD unit, configured to receive the power from the power transmission tunnel, convert a voltage of the power into a working voltage of the relay and take the power as a working power of the relay;

when the relay acts as a data and power relay of a Powered over Ethernet (POE) system, the PD unit is connected with a PD unit of an Ethernet powered terminal of the POE system and PD units of other relays in parallel to be equivalent to a combined PD;

the PD unit of the relay comprises a rectifier, a PD control circuit module and a voltage converting circuit module;

the rectifier is configured to rectify the power received from the power transmission tunnel;

the PD control circuit module comprises a main control circuit and an in-position equivalent resistance adjusting circuit;

the main control circuit is configured to provide the rectified power to a power converting circuit module and perform a control operation in PD detection;

the in-position equivalent resistance adjusting circuit is configured to make the PD control circuit module where the in-position equivalent resistance adjusting circuit is located present a pre-defined equivalent resistance value during a PD detection phase, where the pre-defined equivalent resistance value makes an in-position indication equivalent resistance of the combined PD meet requirements of IEEE802.3af; and the power converting circuit module is configured to convert a voltage of the power received from the PD control circuit module into a working voltage of the relay and take the power as the working power of the relay.

10. The system of claim 9, wherein the PD control circuit module further comprises: a power consumption indication equivalent current adjusting circuit and/or a starting impulse current adjusting circuit;

the power consumption indication equivalent current adjusting circuit is configured to make the PD control circuit module where the power consumption indication equivalent current adjusting circuit is located present a pre-defined equivalent current value during a PD power consumption detection phase, where the pre-defined equivalent current value makes a power consumption indication equivalent current of the combined PD meet the requirements of IEEE802.3af; and the starting impulse current adjusting circuit is configured to make a starting impulse current of the PD control circuit module where the starting impulse current adjusting circuit is located smaller than a pre-defined maximum starting current value during a power-on phase, where the pre-defined maximum starting current value makes an starting impulse current of the combined PD meet the requirements of IEEE802.3af.

11. The system of claim 10, wherein the in-position equivalent resistance adjusting circuit, the power consumption indication equivalent current adjusting circuit and the starting impulse current adjusting circuit are all adjustable resistances.

* * * * *